（12） United States Patent
Olshinka

(10) Patent No.: US 10,348,447 B2
(45) Date of Patent: Jul. 9, 2019

(54) SYSTEM AND METHOD OF CONTROLLING OPERATION OF CONNECTED DEVICES

(71) Applicant: Telit Technologies (Cyprus) Ltd., Larnaca (CY)

(72) Inventor: Gal Olshinka, Boca Raton, FL (US)

(73) Assignee: Telit Technologies (Cyprus) Ltd., Larnaca (CY)

( * ) Notice: Subject to any disclaimer, the term of this patent is extended or adjusted under 35 U.S.C. 154(b) by 100 days.

(21) Appl. No.: 15/513,922

(22) PCT Filed: Sep. 25, 2015

(86) PCT No.: PCT/EP2015/072062
§ 371 (c)(1),
(2) Date: Mar. 23, 2017

(87) PCT Pub. No.: WO2016/046353
PCT Pub. Date: Mar. 31, 2016

(65) Prior Publication Data
US 2018/0331782 A1      Nov. 15, 2018

(30) Foreign Application Priority Data
Sep. 26, 2014   (GB) .................................. 1416983.3

(51) Int. Cl.
*H04L 1/00*      (2006.01)
*H04L 12/26*     (2006.01)
(Continued)

(52) U.S. Cl.
CPC .......... *H04L 1/0025* (2013.01); *H04L 1/0002* (2013.01); *H04L 43/0811* (2013.01);
(Continued)

(58) Field of Classification Search
CPC . H04L 1/0002; H04L 1/0025; H04L 43/0811; H04L 43/0817; H04L 43/10;
(Continued)

(56) References Cited

U.S. PATENT DOCUMENTS

2011/0200052 A1\* 8/2011 Mungo ................... H04W 4/70
                                                      370/401
2012/0131095 A1\* 5/2012 Luna ....................... H04L 67/04
                                                      709/203
(Continued)

FOREIGN PATENT DOCUMENTS

EP         2 624 598         8/2013
EP         2 730 108         9/2015
(Continued)

OTHER PUBLICATIONS

International Search Report and Written Opinion for International Application No. PCT/EP2015/072062 dated Nov. 16, 2015.

*Primary Examiner* — Benjamin H Elliott, IV
(74) *Attorney, Agent, or Firm* — Pearl Cohen Zedek Latzer Baratz LLP

(57) ABSTRACT

A system and method of controlling the operation of M2M devices in a communications network is provided. The M2M devices are configured to send messages to one or more application servers via the network. A device management system is used to receive via the network messages relating to the operation of any of the M2M devices, the communications network and the one or more application servers. The device management system uses one or more processors to monitor the operation of any of the network, the M2M devices and the one or more application servers using said messages, detect at least one predetermined operating condition based on said monitoring, and in response to said
(Continued)

detection, communicate a request for one or more of said M2M devices to change communication pattern.

19 Claims, 7 Drawing Sheets

(51) Int. Cl.
    *H04W 4/50*           (2018.01)
    *H04W 4/70*           (2018.01)
    *H04W 8/24*            (2009.01)
    *H04W 48/06*          (2009.01)
    *H04W 48/12*          (2009.01)

(52) U.S. Cl.
    CPC .......... *H04L 43/0817* (2013.01); *H04L 43/10* (2013.01); *H04L 43/12* (2013.01); *H04W 4/50* (2018.02); *H04W 4/70* (2018.02); *H04W 8/24* (2013.01); *H04W 48/06* (2013.01); *H04W 48/12* (2013.01)

(58) Field of Classification Search
    CPC .......... H04L 43/12; H04W 4/70; H04W 4/50; H04W 8/24; H04W 48/06; H04W 48/12
    See application file for complete search history.

(56) References Cited

U.S. PATENT DOCUMENTS

2012/0284385 A1* 11/2012 Kavanaugh ............ H04W 4/70 709/223
2013/0045706 A1* 2/2013 Hsu ........................ H04W 4/70 455/404.1
2014/0071945 A1* 3/2014 Li ........................ H04W 48/08 370/331
2014/0113609 A1* 4/2014 Elloumi ................ H04W 4/001 455/418
2014/0244838 A1* 8/2014 Ryu ........................ H04L 43/04 709/224
2015/0382132 A1* 12/2015 Wu ........................ H04W 4/70 370/328
2016/0044520 A1* 2/2016 Iyer ........................ H04W 24/08 370/252
2016/0192223 A1* 6/2016 Wu ........................ H04W 4/70 370/252
2016/0242229 A1* 8/2016 Balachandran ......... H04W 4/70
2017/0201411 A1* 7/2017 Mladin .................. H04W 4/70
2017/0295491 A1* 10/2017 Gehrmann ............ H04W 12/06

FOREIGN PATENT DOCUMENTS

| WO | WO 2011/097737 | 8/2011 |
| WO | WO 2011/134554 | 11/2011 |
| WO | WO 2011/160232 | 12/2011 |
| WO | WO 2012/020849 | 2/2012 |
| WO | WO 2012/094278 | 7/2012 |
| WO | WO 2012/109531 | 8/2012 |
| WO | WO 2013/008165 | 1/2013 |
| WO | WO 2013/011472 | 1/2013 |
| WO | WO 2014/182694 | 11/2014 |

* cited by examiner

SYSTEM AND METHOD OF CONTROLLING OPERATION OF CONNECTED DEVICES

CROSS-REFERENCE TO RELATED APPLICATIONS

This application is a National Phase Application of PCT International Application No. PCT/EP2015/072062, entitled "SYSTEM AND METHOD OF CONTROLLING OPERATION OF CONNECTED DEVICES", International Filing Date Sep. 25, 2015, published on Mar. 31, 2016 as International Publication No. WO 2016/046353, which in turn claims priority from GB Application No. 1416983.3, filed Sep. 26, 2014, published on Mar. 30, 2016 as GB Publication No. 2530552, both of which are incorporated herein by reference in their entirety.

TECHNICAL FIELD

The present invention relates generally to the operation of connected devices, such as but not limited to machine to machine (M2M) devices. Such devices may be connected to each other or to other apparatus such as one or more servers, for example via a communications network.

BACKGROUND OF THE INVENTION

Connected devices are proliferating at an exponential rate. They are not only used for communications between people but are now used increasingly in various situations for communicating information relating to machinery. Thus there are now in operation many communication devices that are connected to each other, for example via one or networks which may be wired, or wireless or both. Examples of such devices include "machine to machine" or "M2M" devices or units. These may be defined as devices that are able to communicate with other devices of similar ability using wired and/or wireless technology. An example of another device of similar ability is a server. Thus for example it is typical for an M2M device to communicate with a server dedicated to an application running on the device. M2M devices have been proposed for use in situations such as smart metering, for example for use of electricity, monitoring the operation of vehicles and many others. The communication of M2M devices with each other and with other devices such as dedicated servers without human intervention has led to the coining of the expression "the internet of things". It is estimated that the number of communication devices including M2Ms and those for personal use, already exceeds the number of humans on earth. This proliferation can lead to problems for network operators, particularly cellular network operators, as will be explained in more detail below.

SUMMARY OF EMBODIMENTS OF THE INVENTION

An embodiment of a method according to the invention is for controlling the operation of connected devices, such as M2M devices, in a communications network, for example a mobile communications network. The devices may be configured to send messages containing information via a network to one or more servers or to each other. The servers may for example be dedicated to respective applications running on the devices. A device may run one application and communicate with one application server, or it may run more than one application and communicate with respective application servers. Alternatively one application server may be dedicated to multiple applications. Connected devices which may benefit from the present invention, e.g. M2M devices, need not communicate with application servers. According to some embodiments of the invention they may communicate with each other via the network. The network may comprise one or more communication nodes, at least some of which are capable of sending receiving or forwarding information, e.g. messages, over a communications channel. Thus in some embodiments, messages will be sent from a device to another device or an application server via one or more nodes in the network. According to some embodiments of the invention the method uses a device management (DM) system which may include a DM server.

The use of DM systems and DM servers is known in the art. In some embodiments of the present invention a DM system may be provided with new functionality.

The DM system may receive messages relating to the operation of any of the devices or the application server(s) or the network. The DM system may then, for example using one or more processors:

monitor the operation of any of the network, the devices and the application server(s) using said messages received via the network, detect at least one predetermined operating condition based on said monitoring, and in response to said detecting, communicating a request for one or more of said devices to change communication pattern.

A request to change communication pattern may be sent directly from the DM system to a device or it may be sent to a device via an application server with which the device is in communication.

Embodiments of the invention may be implemented in several ways. According to some embodiments, the DM system is established in a new central management domain, accessible to an application server and also to the devices. The devices may be provided with code additional to their normal operating code permitting them to communicate with the DM system and provide messages to be used by the DM system. Similarly the application server may also be provided with additional code. It should be noted that the code useful for implementing some embodiments of the invention may be provided in machinery with which the M2M device is associated instead of, or in addition to, the M2M device itself.

According to some embodiments of the invention an application server may operate to serve one or more device applications that are independent of the operation of the network via which the devices communicate with an application server.

An example of an M2M device and associated machinery is a coffee machine provided with an M2M device configured such that the M2M device reports to an application server via a core network information relating to the coffee machine. This information may include for example the amount of cups of coffee it has dispensed, thereby indicating to the application server when more coffee is required to be sent to its location. Both the coffee machine and the M2M device in this example may be controlled by one or more processors and code useful for implementing the invention may be implemented in one or more processors in the coffee machine, the M2M device, or both. In this and some other embodiments of the invention, both the application running on the device and the application server itself operate at a level, or layer, above the operation of the network, in other words outside the network. Similarly a device management system may operate outside the communication network. Thus for example the control of the operation of devices according to some embodiments of the invention may be independent of the type of network by which the devices and server(s) communicate, operating sector and other network-specific parameters.

By exerting some control over the communication pattern of one or more devices, such as M2M devices, the connectivity of the devices to any of the network, to the application server and to each other may be controlled.

The detection of at least one predetermined operating condition may comprise determining an operating condition parameter such as "number of access attempts required to reach application server" and then determining whether than parameter satisfies one or more predetermined criteria, such as threshold criteria.

Some embodiments of the invention may also comprise a DM system for controlling the operation of a plurality of devices such as M2M devices in a communications network.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
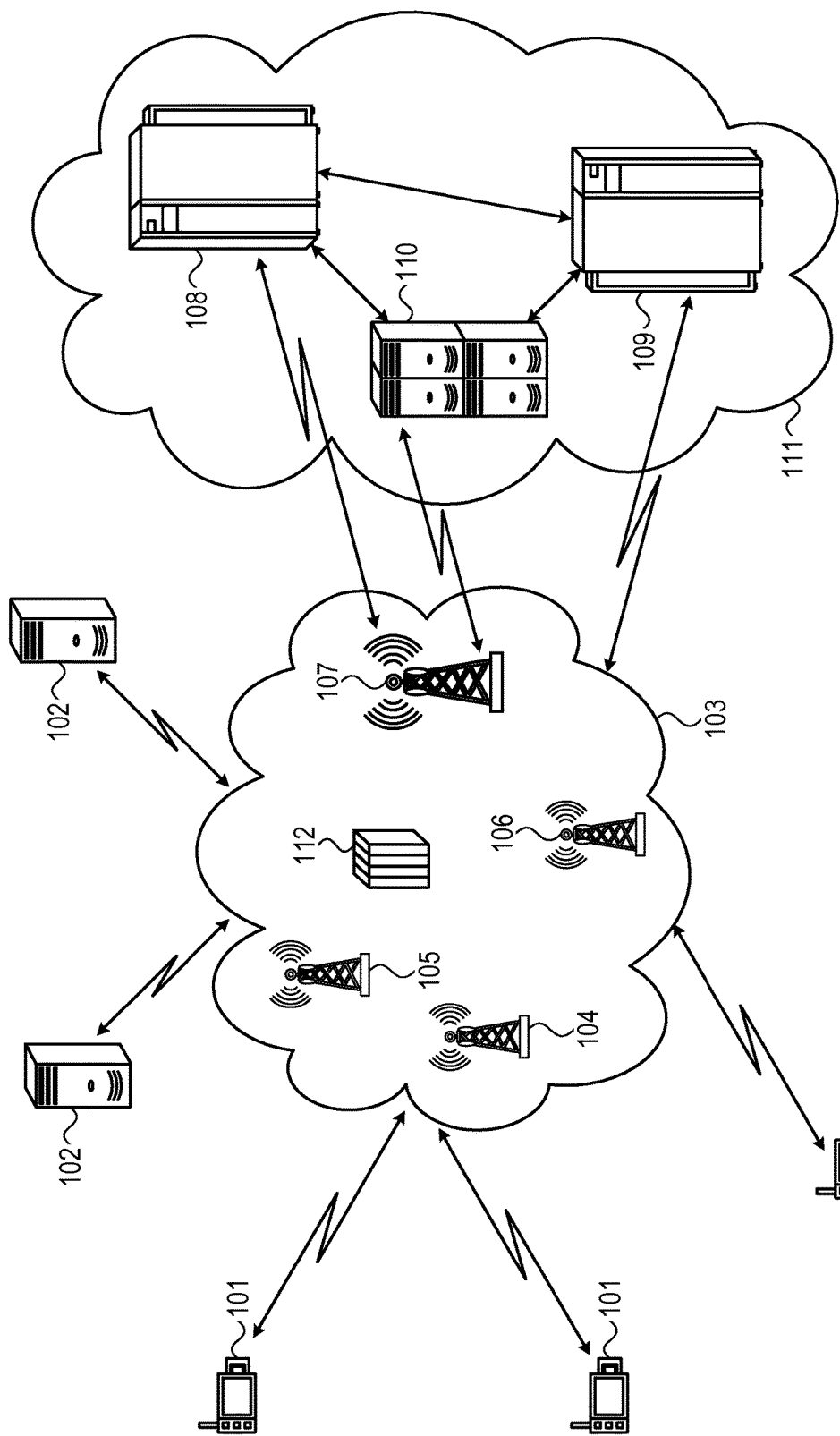
FIG. 1 is a schematic diagram showing the physical relationship between components of a cellular communication system according to some embodiments of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information transitory or non-transitory processor-readable medium that may comprise, e.g. store, instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

In the following, methods and systems for controlling the operation of M2M devices are described as examples of implementation of the invention. However the invention is not limited to the control of M2M devices and may be implemented to control the operation of any connected devices, meaning devices either connected to each other or to other apparatus such as one or more servers, via a communications network. Devices whose operation may be controlled according to embodiments of the invention may be termed "connected devices" or "communication devices".

M2M refers to technologies that allow both wired and wireless devices to communicate with other devices. In the following the expression "M2M" device is intended to devices capable of communicating with other devices over a communications network. M2M communication is also known as Machine-Type Communication (MTC).

An example of a device with which an M2M device may communicate is a server. Such a server may be dedicated to an application, or multiple applications, running on an M2M device. Such a server is also sometimes referred to as a backend server. An application server or backend server may perform other operations that are not related to applications running on M2M devices and need not be exclusively dedicated to one or more M2M applications.

Many M2M devices are configured to communicate using cellular wireless communication systems such as GSM, WCDMA and LTE. It is also possible for M2M devices to communicate using other wired or wireless technology including but not limited to those using protocols such as ZigBee, Bluetooth and WiFi, or a combination of wired and wireless communication. Embodiments of the invention are not limited in terms of the kinds of wired or wireless communications technology used by the devices to communicate with other devices, such as servers. Embodiments of the invention may be used to control devices operating in mobile or static communications networks.

According to some embodiments of the invention, M2M devices are configured to send messages to an application server. One non-limiting example is an amount of electricity used in the case of an M2M device being a smart meter. The devices may communicate with the application server via a network. This network may be part of a cellular network or may be part of a wired or other wireless or combined wired and wireless network that serves the same function, e.g. routing signals between the M2M device and the application server.

An application server may operate to receive and process information received from M2M devices running an application served by the application server. Applications for M2M devices often include code which manages the connectivity of the M2M device with the network. Thus for example an application may include code which governs how an M2M device behaves in the event that a connection to the application server or an intermediate node in the network cannot be established. It is often the case that the development of such applications is independent of, and therefore not controlled or approved by, the network operator.

M2M devices running a particular application may be configured, through running of the application, to make repeated attempts at frequent intervals to access an application server that is not available, thereby overloading the network. It is possible that millions of devices may attempt to communicate with a server by frequently re-registering with the network resulting in a signaling storm. In one instance already this has caused a failure in a network which lasted for several hours.

Some embodiments of the present invention address this problem by communicating a request for an M2M device to change its communication pattern. According to some embodiments, this may be achieved without any intervention on the part of the network operator, which is of course desirable from the viewpoint of the network operator.

Figure 2:
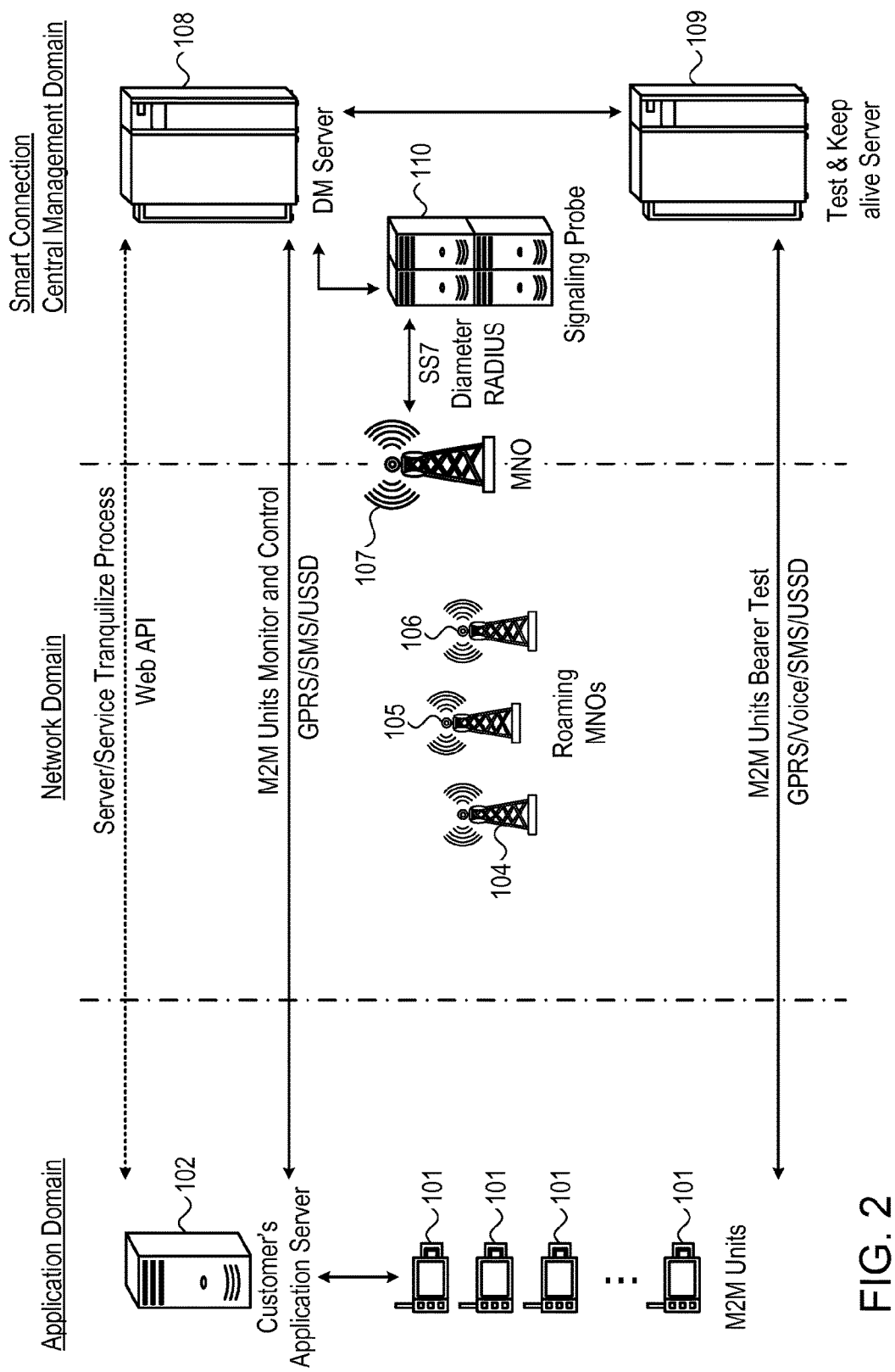
FIG. 2 is a schematic diagram showing the domain relationship of components of a cellular communication system according to some embodiments of the invention.

FIGS. 1 and 2 show schematically a cellular communication system according to some embodiments of the invention. However as noted above, embodiments of the invention are not limited to cellular communications and the cellular communications system is used as one example of a system in which embodiments of the invention can be implemented. FIG. 1 illustrates the physical relationship between the components of the system, and FIG. 2 shows the same components arranged according to signaling domain. As shown in FIGS. 1 and 2, M2M devices 101 communicate with one or more application servers 102 in the application domain. Multiple application servers 102 are shown in FIG. 1. Only one is shown in FIG. 2 for purposes of clarity. This communication between device 101 and server 102 is via a communications network 103 shown in FIG. 1 including a number of nodes in the network domain operated by one or more mobile network operators (MNOs). Four nodes 104-107 are illustrated in FIGS. 1 and 2 but it will be appreciated that the communications network may include any number of nodes.

According to some embodiments of the invention, the M2M devices also communicate, via the communications network 103, with a DM system including a DM server 108, a test and keep alive server 109, and signaling probe equipment 110. The DM system may include the test and keep alive server 109 and the signaling probe equipment 110. According to some embodiments of the invention, communication between the M2M devices 101 and the DM server 108 is independent of communication between the M2M devices 101 and the application server 102. However, the application server 102 may also communicate directly with one or more of the DM server 108, the test and keep alive server 109 and the signaling probe equipment 110, for example via the communications network 103 or via one or more nodes in the communications network 103.

The network 103 may be notionally divided into an access network and a core network 112. The access network may comprise one or more transmitter/receivers and the core network 112 may comprise router and other switches. Each of the nodes 104, 105, 106, 107 may perform functions as part of the access network and may also include switching apparatus forming part of the core network.

The DM server 108, the test and keep alive server 109 and the signaling probe equipment 110 form components of a DM system. These components may communicate with each other, for example but not necessarily via a local network 111 operating outside the control of any of the mobile network operators. For example, the DM server 108, the test and keep alive server 109 and the signaling probe equipment 110 may comprise nodes of the local network 111. The DM system may be registered with the same network operator as any of the application servers 102 or may be registered with a different network. According to alternative embodiments of the invention, the test and keep alive server 109 and the signaling probe equipment 110 may be separate from the DM system, for example outside the local network 111.

Each of the M2M devices 101 may comprise a computing device including one or more processors as shown and described with reference to FIG. 5 below.

Each of the application server 102, the DM server 108, the test and keep alive server 109 and the signaling probe equipment 110 may each comprise one or more computing devices including one or more processors as shown and described with reference to FIG. 5 below.

Each of the nodes of the communication system 103, including illustrated nodes 104, 105, 106, 107, may comprise in addition to an antenna as indicated in FIGS. 1 to 4 one or more computing devices including one or more processors as shown and described with reference to FIG. 5 below.

Referring to FIG. 2, it will be seen that according to some embodiments of the invention, the M2M units 101 communicate with the one or more application servers in the application domain, or in terms of software hierarchy, at the application layer. The nodes 104-107 communicate with each other in the network domain, or in the network layer. Some embodiments of the invention introduce a new domain, termed in the illustrated embodiment the smart connection central management domain, in which the DM server 108, the test and keep alive server 109 and the signaling probe equipment 110 are located.

According to some embodiments of the invention application servers may be required to connect to the smart connection central management domain, for example this may in future be a requirement imposed by a network operator.

Figure 3:
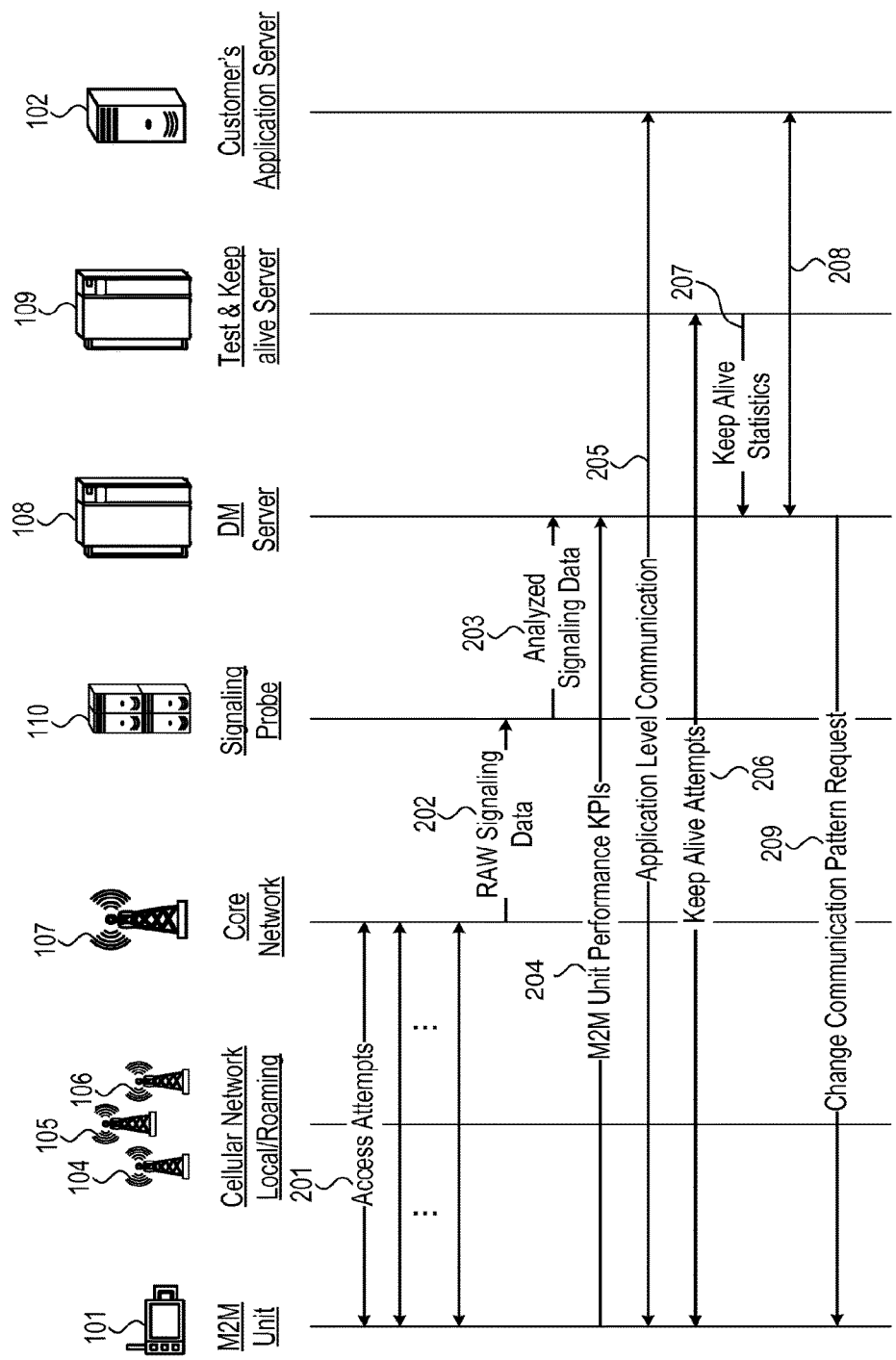
FIG. 3 is a combined signaling and flow diagram illustrating some embodiments of the invention.

The operation of the components of the system shown in FIGS. 1 and 2 according to some embodiments of the invention will now be described with reference to FIG. 3. FIG. 3 illustrates a signal flow between one M2M device 101 and one application server 102 for the sake of clarity but it will be appreciated from FIGS. 1 and 2 that in practice it will be usual for many M2M devices to communicate with one server 102. As noted above some embodiments of the invention may also control communication between respective M2M devices. In such embodiments, the application server 102 illustrated in the figures is replaced by another M2M device 101.

The M2M devices or units 101, one of which is indicated in FIG. 3, are assumed to be already registered with the core network, of which one node 107 is indicated in FIG. 3. Thus according to some embodiments of the invention, the flows indicated in FIG. 3 occur after the establishment of a communication session between the M2M device 101 and a node, e.g. node 107, in the core network. The devices 101 are configured to attempt to access one or more of the application server 102, the DM server 108 and the test and keep alive server 109 by firstly sending access attempts or access requests to the core network represented by node 107. This signal flow is indicated by reference numeral 201. These messages are received at the core network. In the following, reference will be made to operations at node 107 but it is to be understood that these may be performed at any node in the core network.

According to some embodiments of the invention, signaling probe equipment 110 taps into the flow of messages from the devices 101 to the server 108 via the node 107. Thus no dedicated interface to the node is required. This is indicated as flow 202. It is known for a communication node to provide raw signaling data.

According to some embodiments of the invention, the signaling probe equipment 110 may comprise a remote authentication dial in user service (RADIUS) server as is known in the art. Alternatively it may use any other protocol such as Diameter, signaling transport (SIGTRAN) protocol, or GPRS tunneling (GTP). The signaling probe equipment receives raw signaling data and is configured to analyze the data provided to it and provide the results of this analysis to the DM server 108. This is indicated by flow 203. For example a RADIUS server using its accounting function can generate log files that record session statistics used for, amongst other things, system diagnosis. The analyzed signaling data from the signaling probe equipment 110 can highlight issues arising from certain application servers or certain types of M2M device. Although shown as a separate entity, the functions of the signaling probe equipment may be integrated with other functionality at the DM system such as the DM server.

Thus, messages received by the DM server 108 via the network 103 may comprise messages relating to the operation of the M2M devices and/or messages relating to the operation of the application server 102, the latter of which for example may be inferred from the operation of the M2M devices 101 or by messages received directly from the server as will be explained below. For example, the DM server 108 can be advised of the frequency of access requests, sent for example in order to access server 102, sent by an M2M device 101. The success or failure of such access requests can be used to infer a state of the network 103, for example that it is operating normally, that there is degradation of its performance, it is overloaded or it is offline.

An M2M device 101 may be configured to report data relating to its operation or the operation of the network or the application server, directly to the DM server 108. This may be generally termed performance data. The determination by an M2M device of such key performance indicators or KPIs is known. This is indicated by flow 204. This data may include for example, statistics on the number of unsuccessful attempts to reach the application server 102. Thus, this data determined by an M2M device itself can be used to inform the DM server about the operation of the device 101 as well as the application server 102 and possibly also the network 103. For example, a device may make 48 unsuccessful attempts to access the network (prior to attempts to access the application server as indicated by flow 201), followed by a successful attempt. The device 101 may keep a log of attempts to reach the network or an application server or both and report these once an attempt is successful.

If an access attempt is successful there will be application layer communication between the M2M device 101 and the application server 102 as indicated by flow 205 in which information flows in both directions between the device 101 and the server 102 in the normal course of operation of the application running on the M2M device.

As noted above in connection with FIGS. 1 and 2, according to some embodiments of the invention, the DM system further comprises a test and keep alive server 109. This server 109 functions as a test server and can be used to ascertain whether a failure to access the application server 102 is due to a fault with the application server or a fault with the M2M device itself. Although shown as a separate entity, the functions of the test and keep alive server may be integrated with other functionality at the DM system such as the DM server. The test and keep alive server may be used for example in the event that the application server 102, possibly unknown to the device 101, is down for routine maintenance. Thus, if attempts by the M2M device 101 are not successful, for example after a predetermined period or a predetermined number of attempts, an M2M device 101 may attempt to access the test and keep alive server 109 as shown by flow 206. If the M2M device 101 is successful in communicating with the test and keep alive server 109, the test and keep alive server 109 will report back to the DM server 108 as indicated by flow 207. Messages received from the test and keep alive server 109 may comprise status messages, for example indicating the status of devices 101. Thus the DM system may receive messages via the network which also relate to the operation of the M2M devices themselves. The test and keep alive server need not be part of the DM system and may for example be outside the local network 111, in which case it may communicate with the DM system via the network 103.

According to some embodiments of the invention, the one or more application servers 102 are configured to report information relating to their operation to the DM server 108. This is indicated by flow 208. For example an application server may report to the DM server 108 that it is down for routine maintenance, that it is malfunctioning or that it is overloaded, e.g. traffic volume exceeds a predetermined threshold. This might be done on each occasion or a maintenance schedule may be reported to the DM server 108 in advance.

The DM server 108 is configured to monitor the operation of the core network, the devices 101 and the one or more application servers 102 using the messages it receives. On the basis of this monitoring the DM server may detect one or more predetermined operating conditions and in response send a request to the M2M device to change its pattern of communication with the one or more application servers or the core network.

In this way a device may be seduced into changing its communication pattern with the network or an application server or both, overriding a communication pattern dictated by the application. If multiple devices receive similar change communication pattern requests, for example thousands of devices, the effect of a potential signaling storm may be tranquilised.

The operating conditions may be operating conditions of one or more of the application servers, the M2M devices, the core network or any combination of these.

Examples of predetermined operating conditions include:
Percentage of failed attempts to access application server exceeds threshold, for example deduced from KPI messages received in flow 205

Units starting to test themselves—this itself suggests a problem, possibly with the application server Keep alive attempts functionality OK but application server not reachable KPIs (flow 205) indicate failure to connect—this can be analyzed at the DM system and might indicate a problem with the network in certain area e.g. country Any of the above may be used to infer one or more of the following which may also be predetermined operating conditions:

Application server traffic overload

Application server failure (possibly resulting from overload or other cause)

Network traffic overload

Network failure (possibly resulting from overload or other cause)

The predetermined operating conditions may be stored in memory, for example in the form of a look up table. The request to change communication pattern may be selected from a number of options. The selection of request may be according to one or more predetermined rules depending on the one or more operating conditions detected by the DM server. According to some embodiments of the invention the detection of a predetermined operating condition followed by the sending of a request to change communication pattern may be repeated, for example until a problem situation is resolved, e.g. the predetermined operation condition no longer persists.

Requests to change communication pattern may include any requests for a device to alter its communication pattern from a default communication pattern, for example dictated by an application running on the device. Thus the request to change communication pattern overrides the application, possibly for a limited period of time. A request to change communication pattern might request a device 101 to change the frequency or nature of communications with an application server or the network. For example, a device might be asked to refrain entirely from communicating with the server for a set period of time, to communicate less frequently (or possibly more frequently), or to lower (or possibly increase) its data rate. Examples of requests to change communication pattern include requests to change communication pattern with one or more application servers, requests to change communication pattern with one or more other devices, and requests to reduce usage of communications network resources. Specific examples of requests are:

cease communicating with the application server for a predetermined period of time lower a rate of information communicated to the application server, e.g. for a predetermined period of time lower rate of retry attempts to gain access to the application server, e.g. for a predetermined period of time cease communicating with one or more other M2M devices for a predetermined period of time lower a rate of information communicated to one or more other M2M devices, e.g. for a predetermined period of time lower rate of retry attempts to gain access to one or more other M2M devices, e.g. for a predetermined period of time cease sending access requests to a node for a period of time lower a rate of sending access requests to a node for a period of time lower rate of retry attempts to gain access to the communications network It should be remembered that aggressive behavior on the part of some devices can have a so-called domino effect in that it may lead to similar behavior in other devices. For example if a group of devices overloads a network through the use of too-frequent access requests, this can cause the network to fail to allow access by other devices which may then begin to make retry attempts thereby further loading the network which may lead to complete failure. A request to change that requires a device to reduce its rate of sending messages can help to avoid this.

According to some embodiments it may be ensured that for a group of devices that have been requested to change communication pattern for a predetermined period of time, that time is not synchronized, otherwise it could lead to all devices in that group recommencing previous potentially damaging behavior at the same time and leading to a repeat of an undesirable operating condition.

Communication between the DM server 108 and the M2M devices 101 may use any known protocol such as is already used for communication between M2M devices and application servers.

Figure 4:
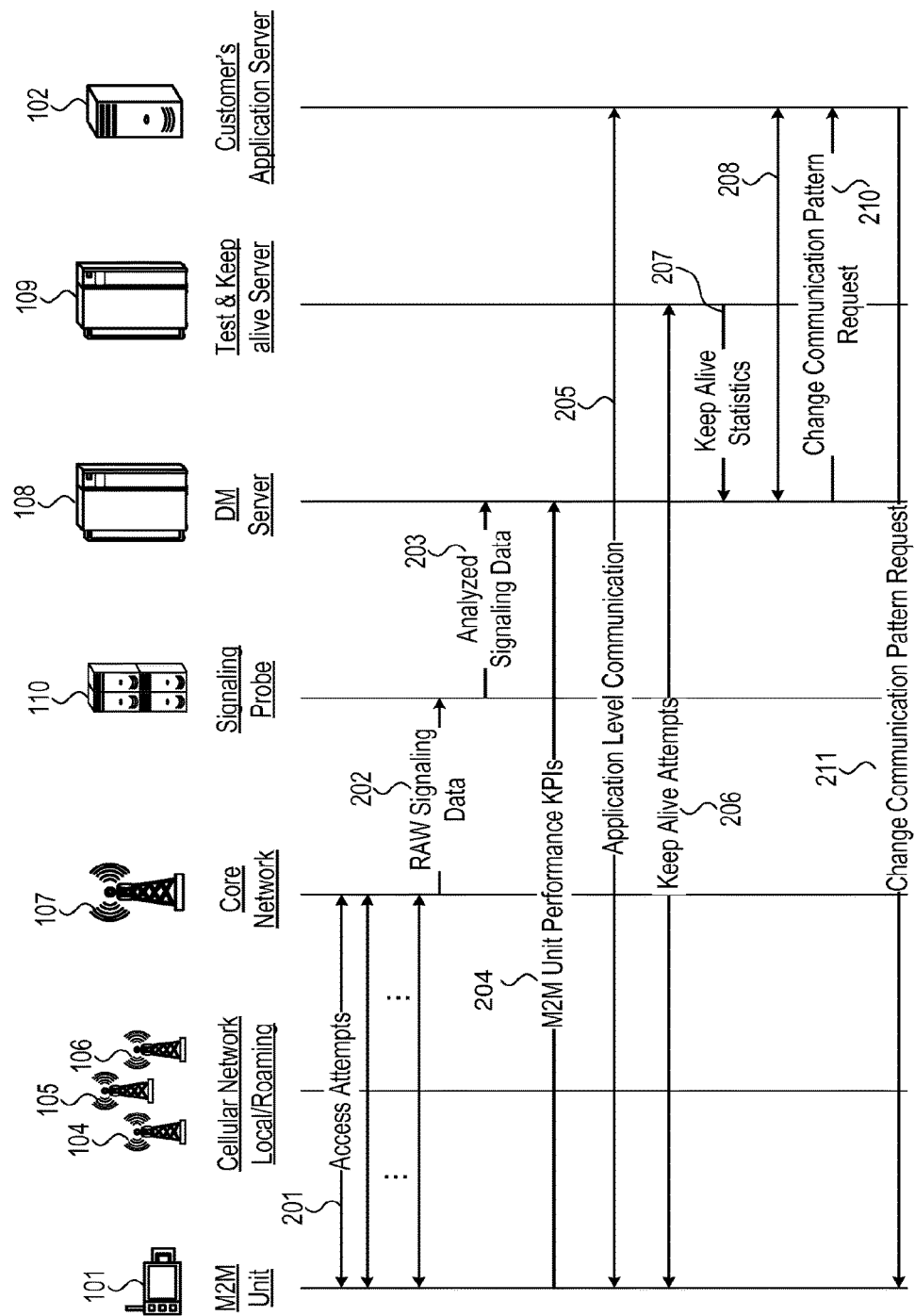
FIG. 4 is a combined signaling and flow diagram illustrating some embodiments of the invention.

FIG. 4 shows an alternative signaling flow to that shown in FIG. 3. Like flows in FIGS. 3 and 4 are indicated by like reference numerals. In the flow of FIG. 4, instead of a change communication pattern request being sent from the DM server 108 to the M2M unit 101, it is sent from the DM server 108 to the application server 102, as indicated by flow 210. The change request is then sent from the application server 102 to the M2M device 101 as indicated by flow 211.

Whilst according to some embodiments of the invention information is received from the network, this is not essential. Thus according to some embodiments of the invention the DM system may be completely agnostic to the network and vice versa. This has the advantage of not requiring any modification on the part of the network operator, e.g. the core network operator. However according to other embodiments of the invention the network operator may provide information to the DM system in order to improve the operation of the DM system from the point of view of the network operator.

The control of the operation of M2M devices according to some embodiments of the invention may operate in parallel with any system implemented by a network operator to restrict access to the network by M2M devices. One such system is proposed in WO2011/134554. Here it is proposed that a mobile network operator should control M2M traffic by requiring a transceiver to transmit traffic only upon receipt of a permission message. Thus this system controls the establishment of a communication session between a device and a node in the communication network. In contrast, some embodiments of the present invention may operate after the establishment of a communication session between the device and the network, for example between a device and a node in the communication network. Methods and systems according to embodiments of the present invention can be considered to overlay operations by network operators to control traffic.

The possibility of the connectivity of M2M devices being controlled from outside the core network opens up a wide range of options for controlling their operation. The DM system may receive information relating to multiple devices communicating with one or more application servers and therefore be able to identify groups of devices to which a request to change communication pattern should be sent. According to some embodiments all devices in the group may receive the same request. The identification of a group may be done by aggregation of information relating to the operation of multiple M2M devices 101. This aggregation of information is believed to be new. At the moment the only aggregators of information relating specifically to the operation of M2M devices are believed to be the application servers. According to some embodiments of the invention, the DM system is able to aggregate information relating to devices communicating with multiple application servers in contrast with an application server that is only able to aggregate information relating to devices that are communicating with it.

According to some embodiments of the invention, a group of all devices using a particular RAN might be identified for example. In the case where the devices communicating with the DM server are running different applications, according to some embodiments of the invention, a group of all devices communicating with a particular application server might be identified. Then for example, the DM server might determine that all devices running a particular application should be asked to change communication pattern. In a situation where traffic over the network needs to be controlled, the DM server might prioritize some applications over others. Thus for example critical healthcare applications, or power infrastructure applications, might take priority over motoring or leisure applications. A complete hierarchy of all applications running on all M2M devices reporting to the DM system may be operated at the DM system.

Figure 5:
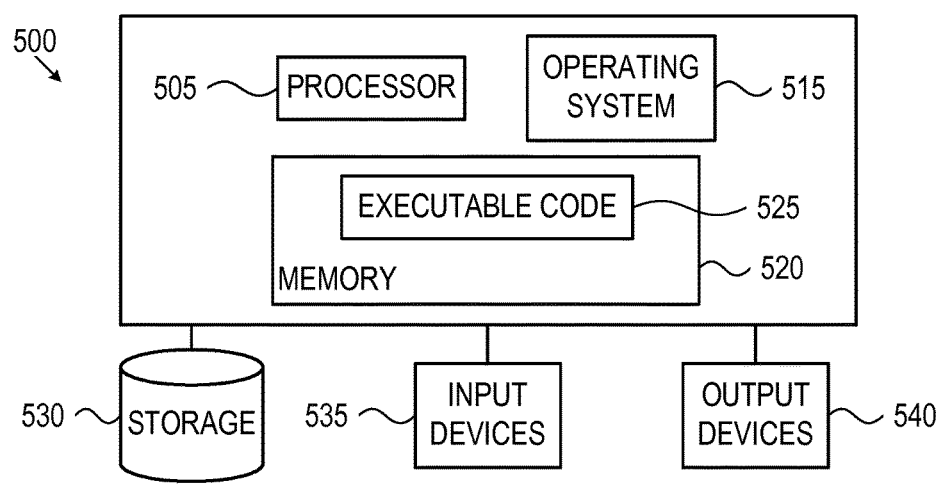
FIG. 5 is a high level block diagram showing components of a computing device according to some embodiments of the invention.

Reference is made to FIG. 5, showing high level block diagram of an exemplary computing device which may be comprised in any of the servers 102, 108 and 109, the signaling probe equipment 110 and any of the nodes 104-107 according to embodiments of the present invention. Any of these may comprise more than one computing device of the kind illustrated in FIG. 5. Computing device 500 may include a processor or controller 505 that may be, for example, a central processing unit processor (CPU), a chip or any suitable computing or computational device, an operating system 515, a memory 520 including executable codes 525, storage 530, input devices 535 and output devices 540. In some embodiments, computing device 500 may include one or more processors similar to processor 505, or more memory units similar to memory 520 and one or more executable code segments similar to executable code 525. Processor 505 may be configured to carry out methods according to embodiments of the invention. For example, processor 505 may be connected to memory 520 storing software or instructions that when executed by processor 505 cause processor 505 to carry out a method according to embodiments of the present invention.

Operating system 515 may be or may include any code segment designed and/or configured to perform tasks involving coordination, scheduling, arbitration, supervising, controlling or otherwise managing operation of computing device 500, for example, scheduling execution of programs. Operating system 515 may be a commercial operating system and may differ between one computing device and another in a system according to the invention. Memory 520 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. In some embodiments, memory 520 is a transitory or non-transitory processor-readable storage medium that comprises instructions for execution by processor 505. Memory 520 may be or may include a plurality of, possibly different memory units.

Executable code 525 may be any executable code, e.g., an application, a program, a process, task or script. Executable code 525 may be executed by processor 505 possibly under control of operating system 515. For example, in the case of a DM server 108, executable code 505 may be an application that causes the DM server to control the operation of M2M devices according to any of the methods according to the invention. In the case of an M2M device 101, executable code 505 may be an application hosted by an application server 102.

Storage 530 may be or may include, for example, a hard disk drive, a Compact Disk (CD) drive, a CD-Recordable (CD-R) drive, a universal serial bus (USB) device or other suitable removable and/or fixed storage unit. In some embodiments, some of the components shown in FIG. 5 may be omitted. For example, memory 520 may be a non-volatile memory having the storage capacity of storage 530. Accordingly, although shown as a separate component, storage 530 may be embedded or included in memory 520.

Input devices 535, which may be included in some computing devices forming part of the systems described above, may be or may include a mouse, a keyboard, a touch screen or pad or any suitable input device. It will be recognized that any suitable number of input devices may be operatively connected to computing device 500 as shown by block 535. In the case of an M2M device, input devices may comprise interfaces to one or more sensors monitoring the operation of a piece of equipment to which the M2M device is attached. For example in the case of a vehicle, input may be received from an accelerometer.

Output devices 540 may include one or more displays, speakers and/or any other suitable output devices. It will be recognized that any suitable number of output devices may be operatively connected to computing device 500 as shown by block 540. Any applicable input/output (I/O) devices may be connected to computing device 500 as shown by blocks 535 and 540. For example, a wired or wireless network interface card (NIC), a modem, printer or a universal serial bus (USB) device or external hard drive may be included in input devices 535 and/or output devices 540.

Embodiments of the invention may include an article such as a computer or processor transitory or non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 520, computer-executable instructions such as executable code 525 and a controller such as controller 505.

Figure 6:
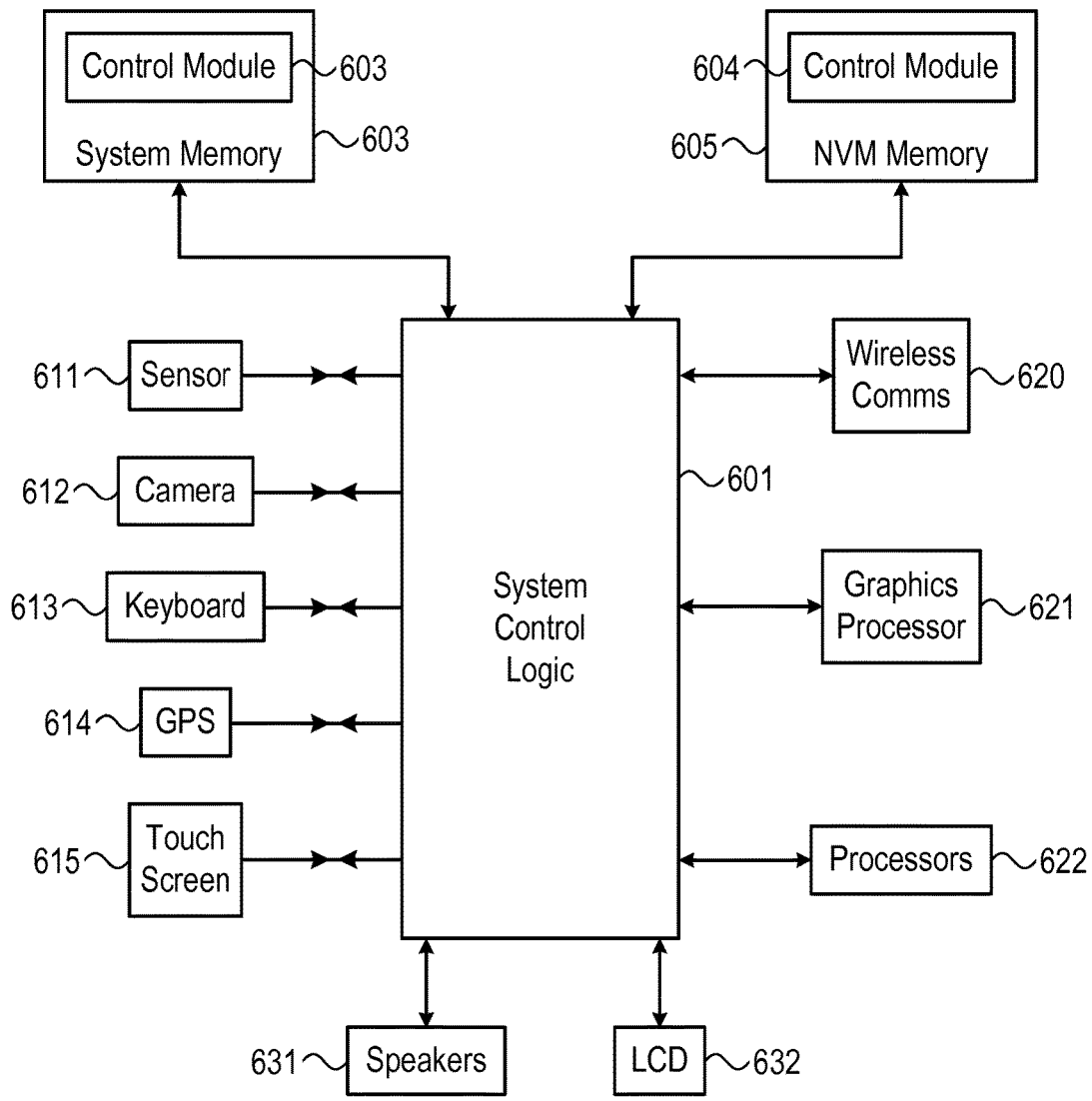
FIG. 6 is a high level block diagram showing components of an M2M device according to some embodiments of the invention.

FIG. 6 is a high level block diagram showing components of an M2M device such as might be controlled according to, or used in, embodiments of the invention. The device shown in FIG. 6 comprises system control logic 601. Control logic 601 may comprise interface controllers to control interfaces with any other component with which it is in communication. System control logic 601 communicates with system memory 603 and non-volatile memory 605. System memory 603 and non-volatile memory 605 may store amongst other things temporary and persistent copies of a control module 604 including instructions which when implemented on one or more processors cause the device to perform its desired functions.

Inputs to the control logic 601 may be from a variety of sources which may be integral to or separate from the M2M device. These include one or more sensors 611 arranged to sense various operating parameters of the machine itself, such as ambient conditions. Further input devices may include a camera 612, keyboard 613, global positioning sensor 614 and touch screen 615. Thus it will be appreciated that some but not all of the inputs may be from a user.

The control logic 601 also interfaces with a wireless communications module 620, via which the device communicates with other devices or apparatus. This may be replaced or augmented by wired communications in some embodiments. Processors interfacing with the control logic 601 may include a graphics processor 621 as well as other processors 622.

Output devices which may be integral with or separate from the device may include any of speakers 631 and a display device such as an LCD screen 632.

A system according to embodiments of the invention may include components such as, but not limited to, a plurality of central processing units (CPU), e.g., similar to controller 505, or any other suitable multi-purpose or specific processors or controllers, a plurality of input units, a plurality of output units, a plurality of memory units, and a plurality of storage units. An embodiment of system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device.

Figure 7:
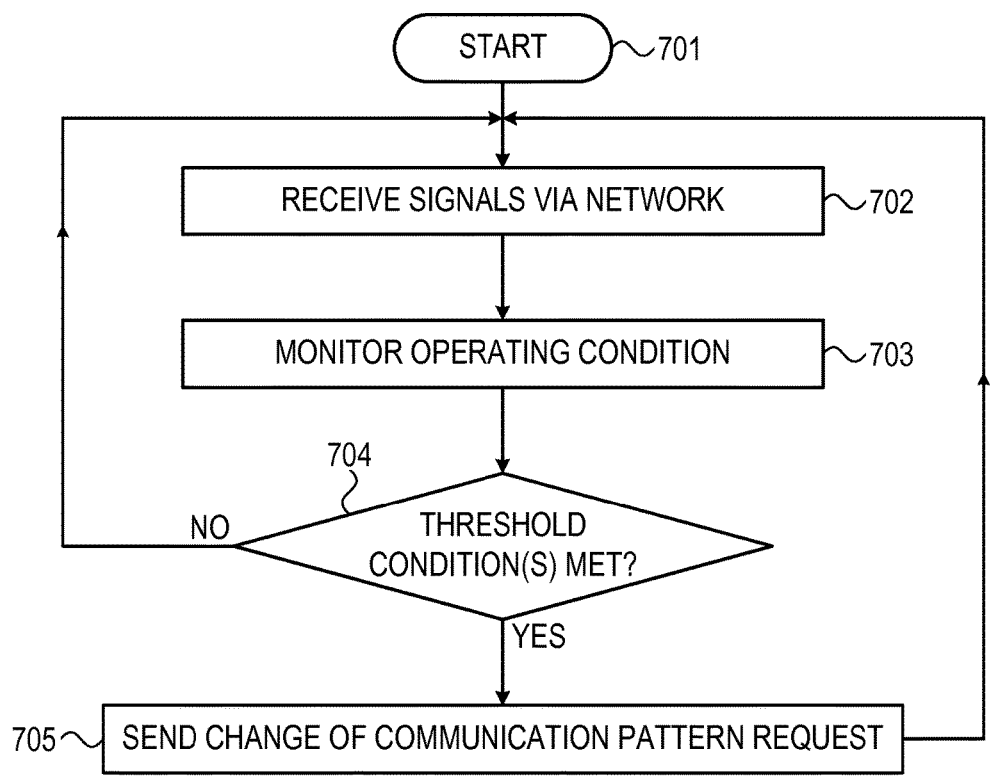
FIG. 7 is a flow diagram illustrating a method according to some embodiments of the invention.

Reference is now made to FIG. 7 which is a flow chart showing an embodiment of a method according to the invention, such as might be implemented in the DM system, for example DM server 108, of the above illustrated embodiments.

The first operation in FIG. 7 is a start or boot up operation 701. The system then begins receiving messages via the network at operation 702. As noted above, these messages may be received from any of the network, e.g. network nodes 104-107; the M2M devices 101; the application servers 102; the signaling probe 110; and the test and keep alive server 109.

The received messages are used at operation 703 to monitor the operation of any of the devices 101; the network, for example any of nodes 104-107; and any of the application servers 102. This monitoring may include determining one or more operating condition parameters, such as percentage of failed attempts to access a particular application server 102.

The results of the monitoring are used at operation 704 to detect one or more predetermined operating conditions. A predetermined operating condition may be determined using one or more threshold conditions. Thus for example, one predetermined operating condition may be: rate of failed access attempts for application server exceeds 50%. Thus, according to embodiments of the invention, in order to detect a predetermined operating condition a decision is made at operation 704 whether a monitored condition meets one or more threshold criteria.

If the decision at operation 704 is positive and the one or more threshold conditions for a particular operating condition are satisfied, then it is determined that a predetermined operating condition exists which requires a change of communication pattern by one or more of the M2M devices. The flow then proceeds to operation 705 where a request to change communication pattern is sent to one or more M2M devices. As noted above the request may be sent to a group of devices. These may be selected according to predetermined criteria. Following the sending of the request(s) at operation 705, the flow returns to operation 702 and the receiving and monitoring continue for the detection of other predetermined operating conditions or a recurrence of the just-detected operating condition.

If the decision at operation 705 is negative and the one or more threshold conditions for a particular operating condition are not met, the flow returns to operation 702 for the detection of any of the predetermined operating conditions.

It will be appreciated that according to embodiments of the invention, several instances or operations 703-705 may run in parallel. Thus for example several different operating conditions may be monitored at the same time using parallel operations 703. This may include determining one or more parameters for each monitored condition. Threshold conditions for those operating conditions may be tested in parallel by multiple instances of operation 704. It will also be appreciated that since more than one kind of change communication pattern request may be sent to M2M devices, it may be necessary for these to be arranged in a hierarchy, so that in the event that two or more different requests are determined to be required following parallel instances of operation 704, one is sent in preference to the others according to the hierarchy among types of request.

Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of controlling operation of devices in a communications network in which the devices are configured to communicate with one or more application servers at an application layer via the communications network or with each other via the communications network, the method comprising, at a device management server outside the communications network:

receiving, via the communications network, messages relating to operation of any of the devices, the communications network and the one or more application servers; and using one or more processors:

monitoring operation of any of the communications network, the devices and the one or more application servers using said messages, detecting at least one predetermined operating condition based on said monitoring, and in response to said detecting, the device management server communicating a request to one or more of the devices for the one or more devices to change communication pattern;

wherein said communication between the one or more devices and the device management server is at the application layer; and in which the one or more of the devices are configured to communicate with a test server in the event of communication failure with one of the one or more application servers and wherein said receiving comprises receiving said messages from said test server.

2. The method of claim 1 in which said operations of receiving, monitoring, detecting and communicating in claim 1 are performed after the establishment of a communication session between one device of the devices and a node in the communications network.

3. The method of claim 1 in which said messages are received via the communications network from one or more of:
one or more network nodes with which one device of the devices is communicating,
the one or more devices, and
the one or more application servers.

4. The method of claim 1 in which said messages received via the communications network include one or more of:
signaling data determined by a network node with which one device of the devices is in communication,
access requests from the one or more devices,
performance data determined by the one or more devices, and
data communicated by the one or more application servers.

5. The method of claim 1 in which the request to change communication pattern comprises a request to change a pattern of communication with one of the one or more application servers.

6. The method of claim 5 in which the request to change communication pattern comprises a request to one or more of:
cease communicating with the application server for a predetermined period of time
lower a rate of information communicated to the application server, and
lower a rate of retry attempts to gain access to the application server.

7. The method of claim 1 in which the request to change communication pattern comprises a request to change a pattern of communication with the one or more other devices.

8. The method of claim 7 in which the request to change communication pattern comprises a request to one or more of:
cease communicating with one or more other devices for a predetermined period of time,
lower a rate of information communicated to one or more other devices, and
lower rate of retry attempts to gain access to one or more other devices.

9. The method of claim 1 in which the devices are configured to send access requests to a node in the communications network and the request to change communication pattern comprise a request to one or more of:
cease sending access requests to said node for a period of time,
lower a rate of sending access requests to said node for a period of time, and
lower a rate of retry attempts to gain access to the communications network.

10. The method of claim 1 in which said predetermined operating condition is one of a plurality of predetermined operating conditions including:
failure of one of the one or more application servers;
failure of the communications network to connect the devices to the application server or to each other, and
failure of a device.

11. The method of claim 1 in which said request is communicated from the device management server to the one or more devices for which a change in communication pattern is requested.

12. The method of claim 1 in which said request is communicated from the device management server to one of the one or more application servers.

13. The method of claim 1 comprising:
selecting a group of a plurality of devices in response to detection of said predetermined operating condition; and
sending, to each device in said group, the same request to change communication pattern that is sent to all of the devices in said group.

14. The method of claim 13 in which the plurality of devices communicate with a plurality of said application servers and said selecting comprises selecting devices communicating with a particular application server.

15. The method of claim 13 the request to change communication pattern configures said plurality of devices to prioritize one or more of said one or more application servers over another to receive communications from devices.

16. A device management server for controlling operation of a plurality of devices in a communications network in which the plurality of devices are configured to send messages to one or more application servers at an application layer via the communications network or with each other via the communications network and the device management server is configured to operate outside the communications network, the device management server comprising:
one or more inputs configured to receive, via the communications network, messages relating to operation of one or more of the plurality of devices and the one or more application servers; and
one or more processors configured to:
monitor operation of any of the communications network, the devices and the one or more application servers using said messages received via the communications network,
detect at least one predetermined operating condition based on said monitoring, and
in response to detecting said at least one predetermined condition, the device management server communicates a request to one or more of said devices for the one or more devices to change communication pattern;
wherein said communication between the one or more devices and the device management server is at the application layer; and
in which the one or more of the devices are configured to communicate with a test server in the event of communication failure with one of the one or more application servers and wherein said receiving comprises receiving said messages from said test server.

17. The device management server of claim 16, wherein the test server is configured to compile keep alive statistics from keep alive attempts received from the plurality of devices.

18. The device management server of claim 17 wherein the test server is outside the device management server.

19. A non-transitory computer readable storage medium comprising instructions which when implemented in a processor in the device management server cause the device management server to implement the method of claim 1.

* * * * *